United States Patent [19]

Rappaport et al.

[11] Patent Number: 4,752,889

[45] Date of Patent: Jun. 21, 1988

[54] DYNAMIC, INTERACTIVE DISPLAY SYSTEM FOR A KNOWLEDGE BASE

[75] Inventors: Alain T. Rappaport; Albert M. Gouyet, both of Portola Valley, Calif.

[73] Assignee: Neuron Data, Inc., Palo Alto, Calif.

[21] Appl. No.: 897,709

[22] Filed: Aug. 18, 1986

[51] Int. Cl.[4] .............................................. G06F 15/24
[52] U.S. Cl. .................................... 364/513; 364/188
[58] Field of Search ................................ 364/513, 188

[56] References Cited

U.S. PATENT DOCUMENTS 4,591,983  5/1986  Bennett et al. .

OTHER PUBLICATIONS

Paper Submitted to Future Computing Systems, entitled Interactive Elicitation of Knowledge from Experts by Mildred L. G. Shaw & Brian R. Gaines, U. of Calgary, Alberta, Canada, (apparently published in 1986).

*Primary Examiner*—Joseph Ruggiero
*Assistant Examiner*—Allen MacDonald
*Attorney, Agent, or Firm*—Philip M. Shaw, Jr.

[57] ABSTRACT

A knowledge system incorporating a graphic display which allows the user, at any time during the use of the system, to select a part of one of the displayed chucks of knowledge (or the only one) and to perform a command which will automatically display the link(s) of a certain nature to other chunks of knowledge. The latter chunks are thus dynamically added to the drawing. The same function can be applied recursively in any direction until no further knowledge chunks are to be displayed. The resulting drawing can be larger than the display screen and graphic window or screen scrolling mechanisms allow one to move from one area of the overall graph to another. A series of functions allow the user to remove a link and its corresponding chunk(s) from the display, to create a new group of chunks (a group is defined as a set of chunks linked together graphically), and to modify the parameter of the display as a function of the nature of the links, the current state of each item (chunks and their elements, links) and the overall state of the system at the time of display.

6 Claims, 8 Drawing Sheets

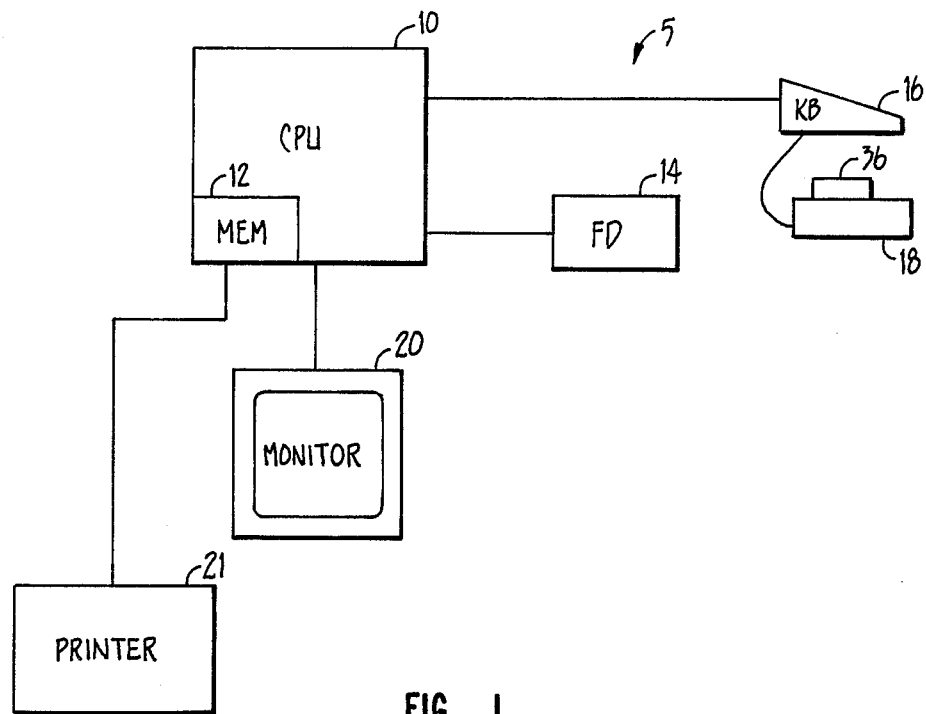
FIG._1.
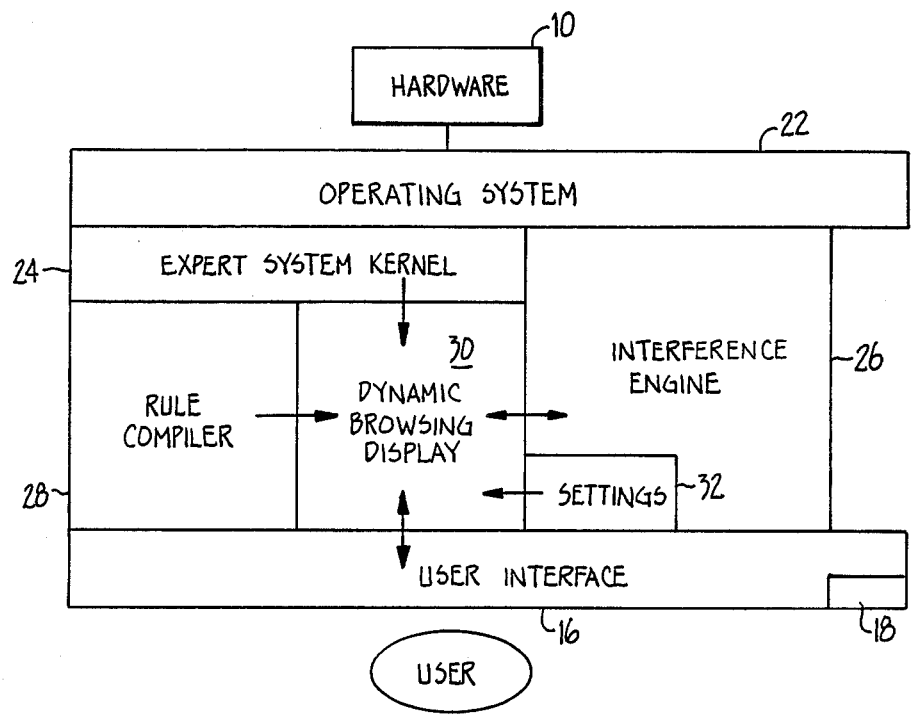
FIG._2.

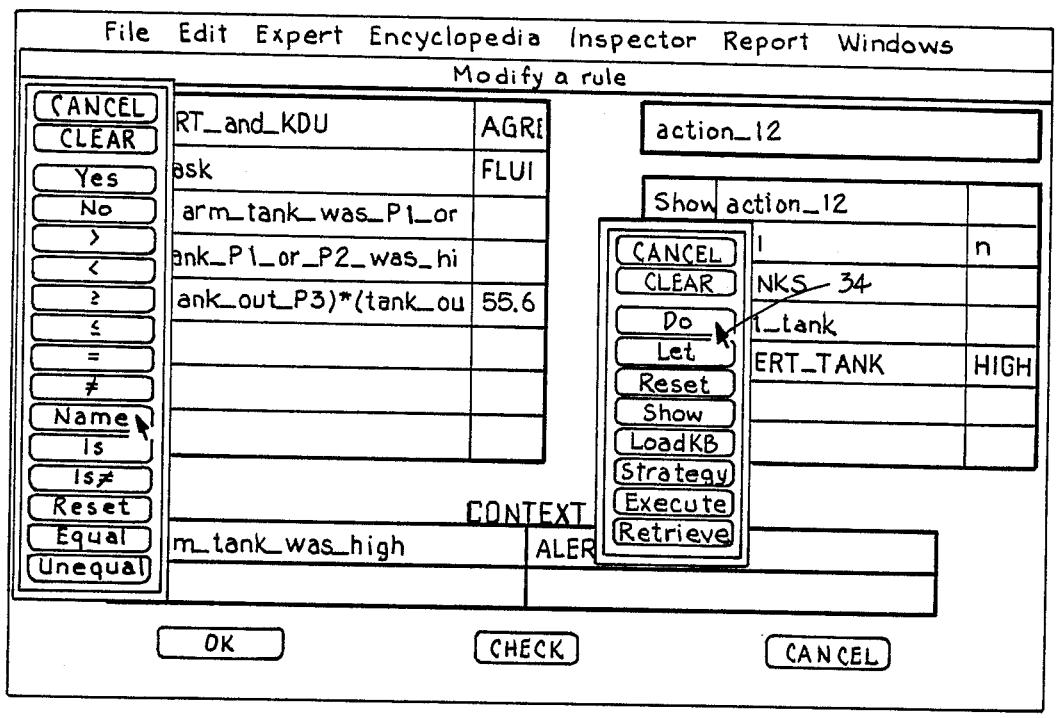
FIG._4.
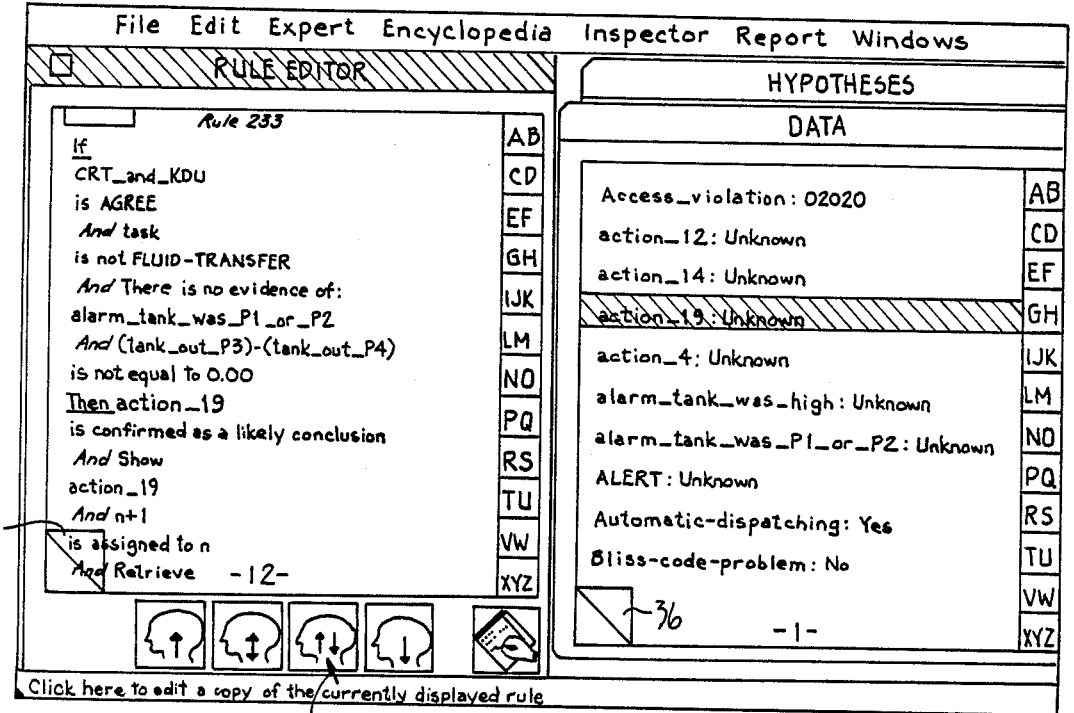
FIG._3A.    FIG._3B.

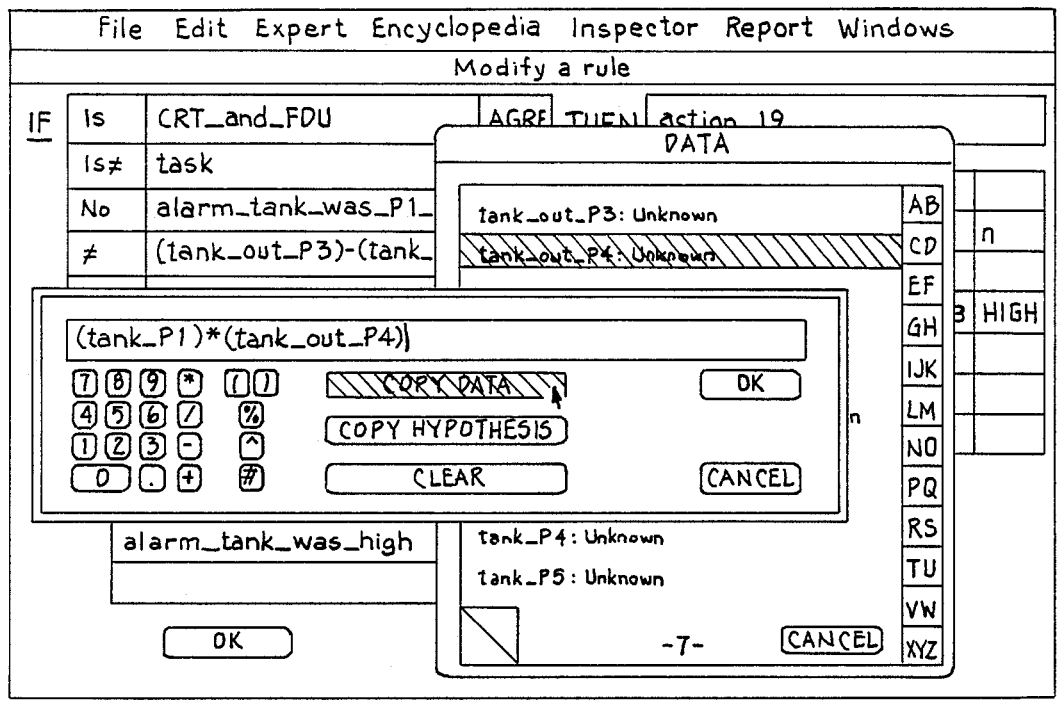
FIG._5.
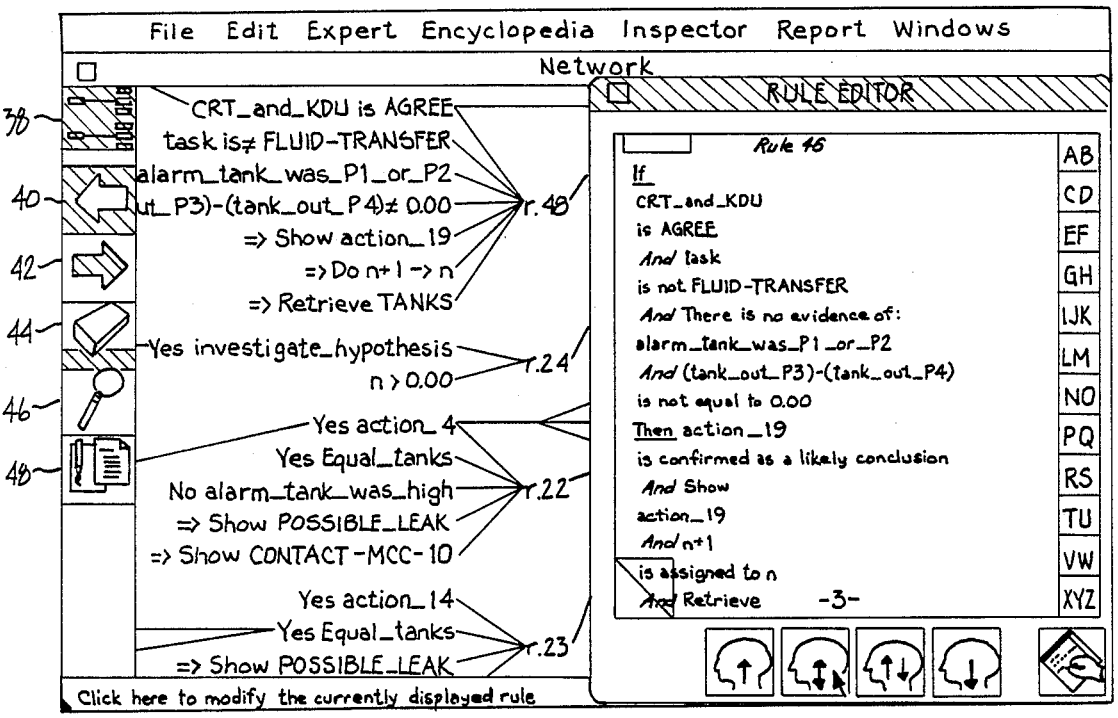
FIG._6.

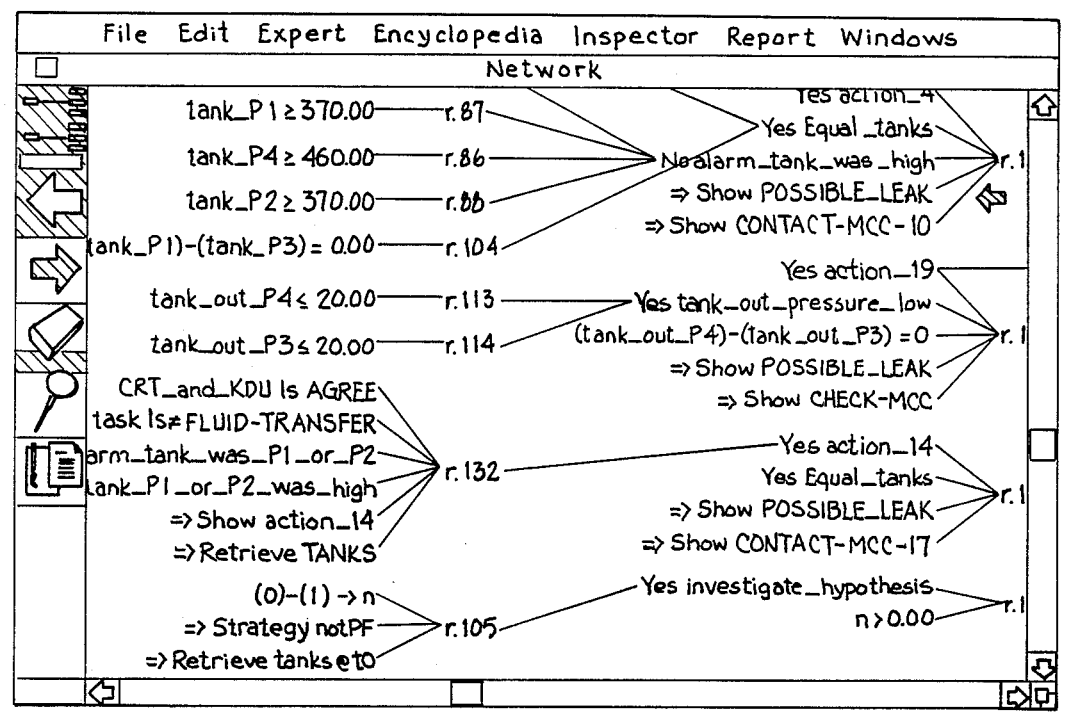
FIG._7.
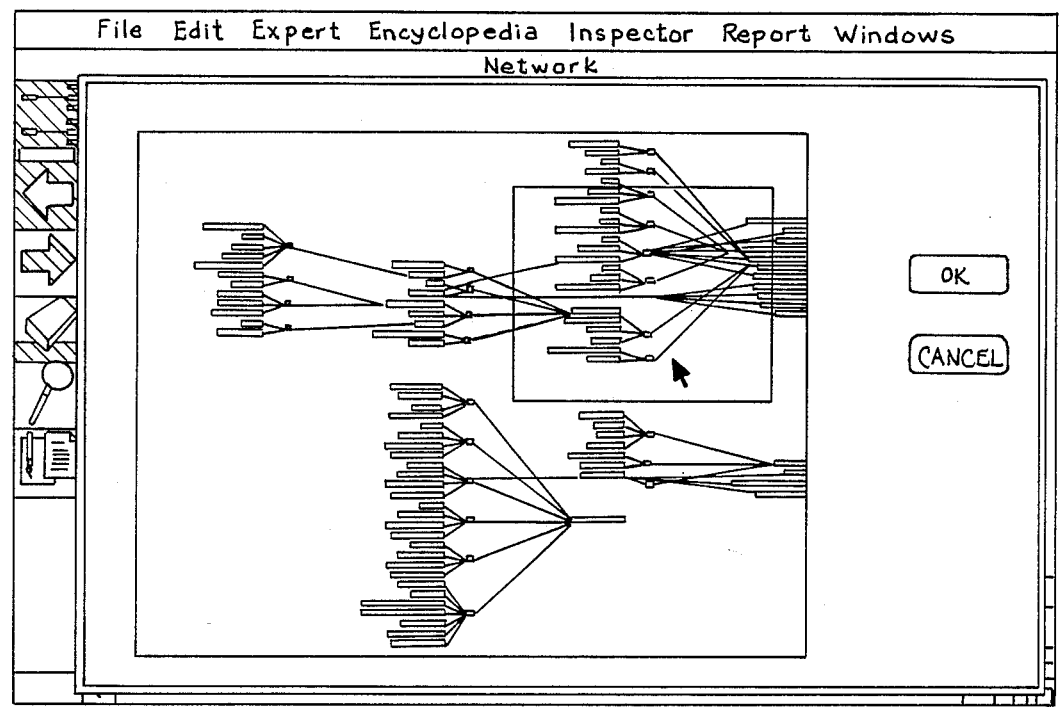
FIG._8.

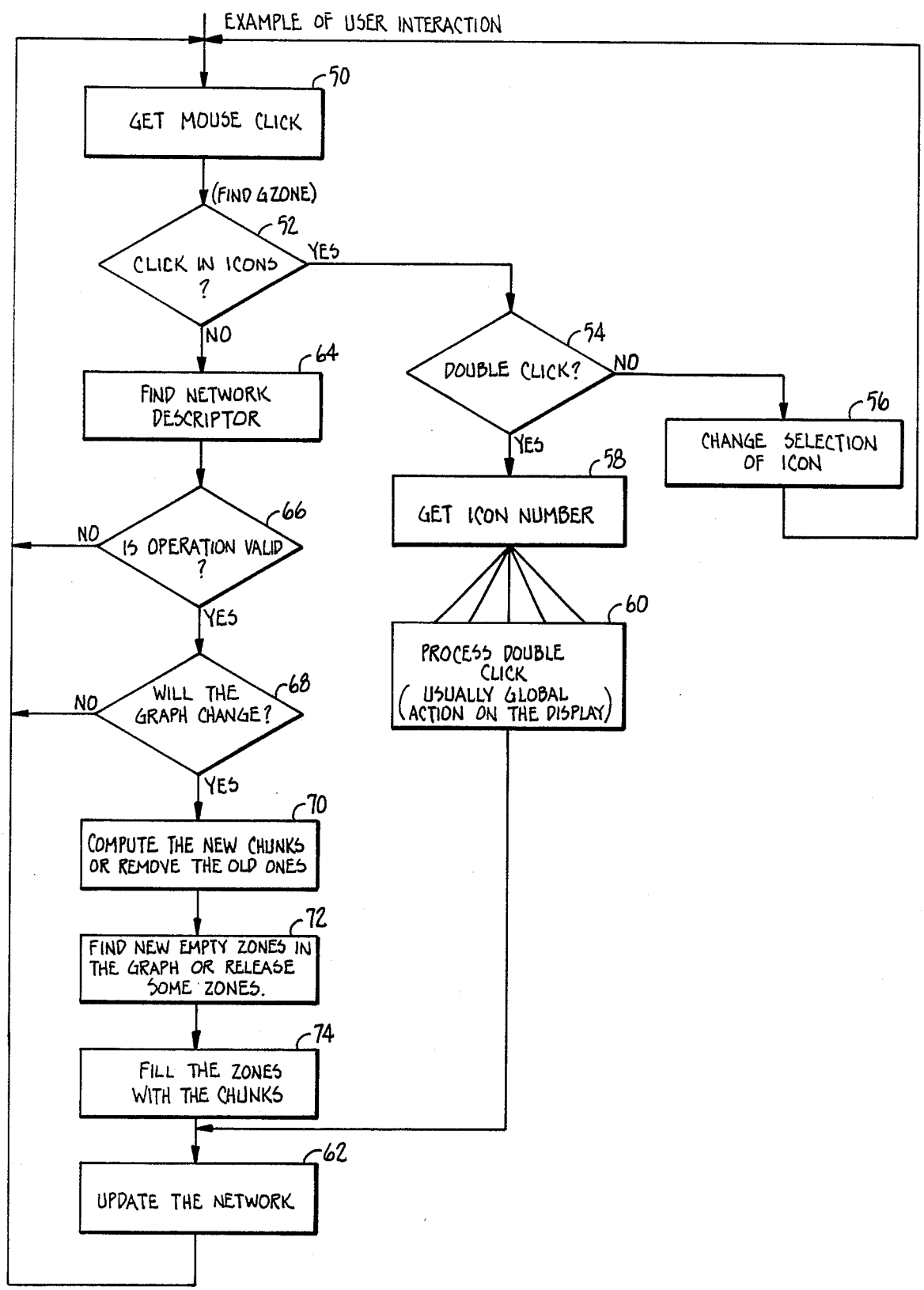
FIG._9.

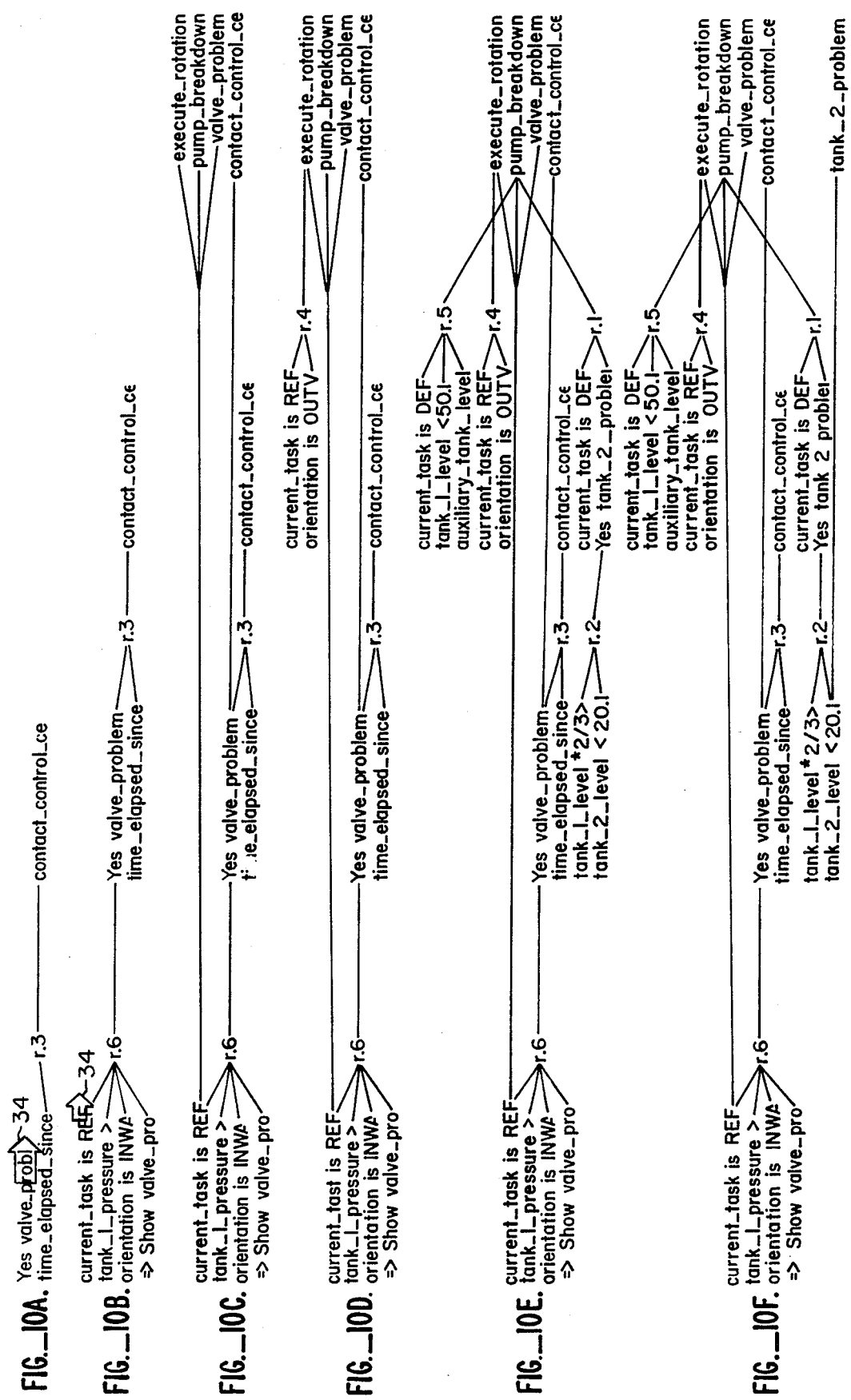

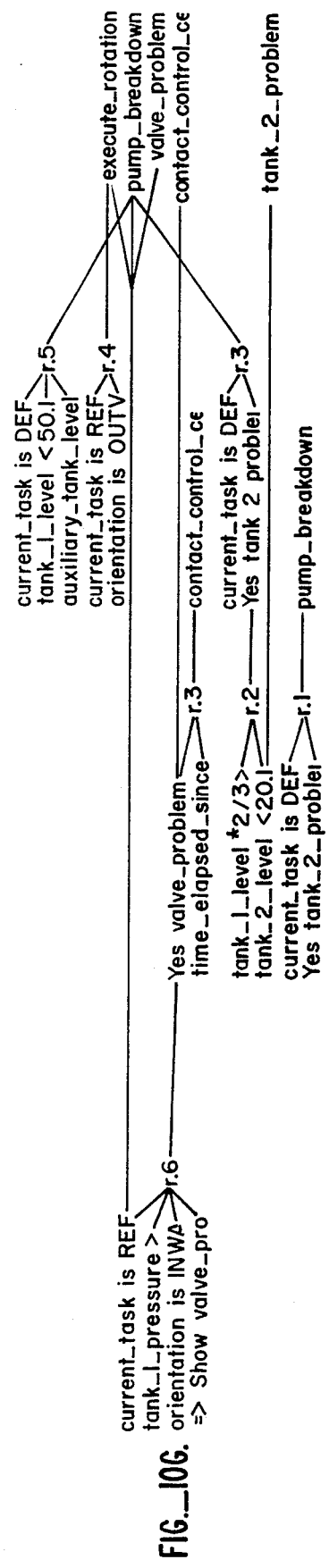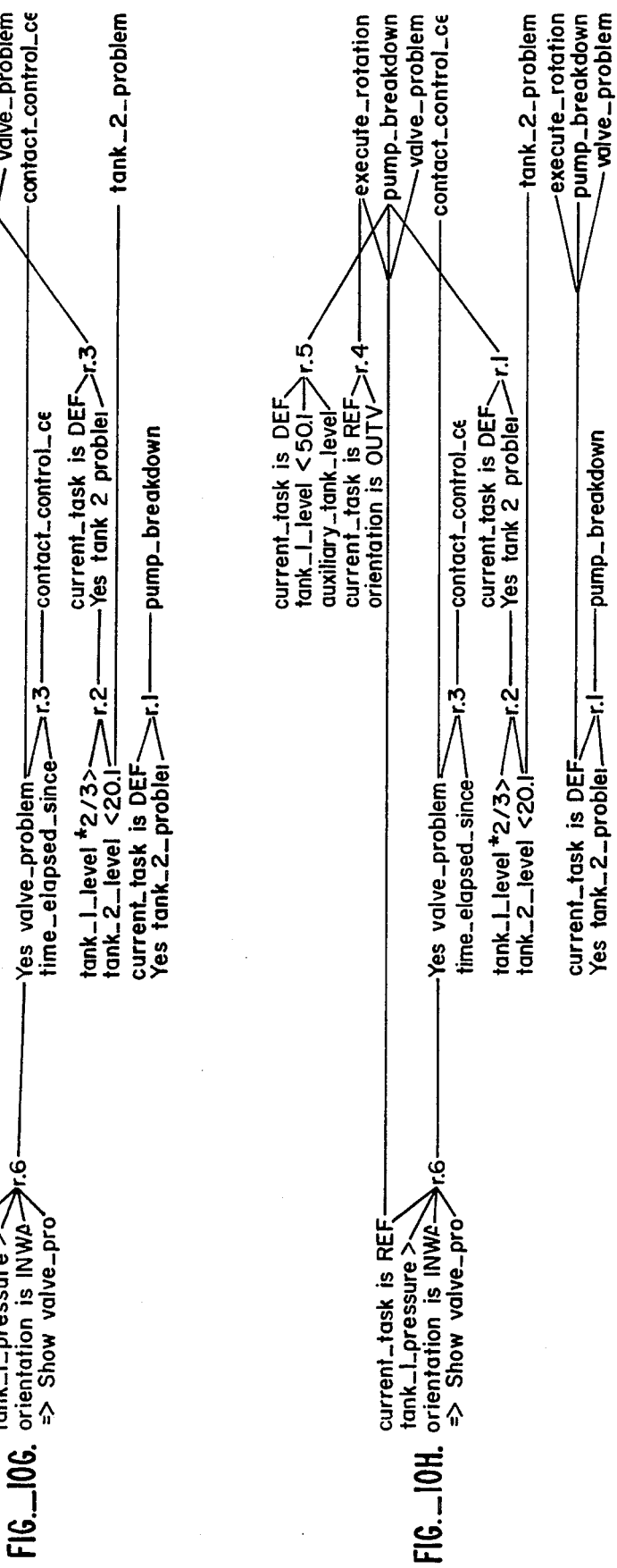

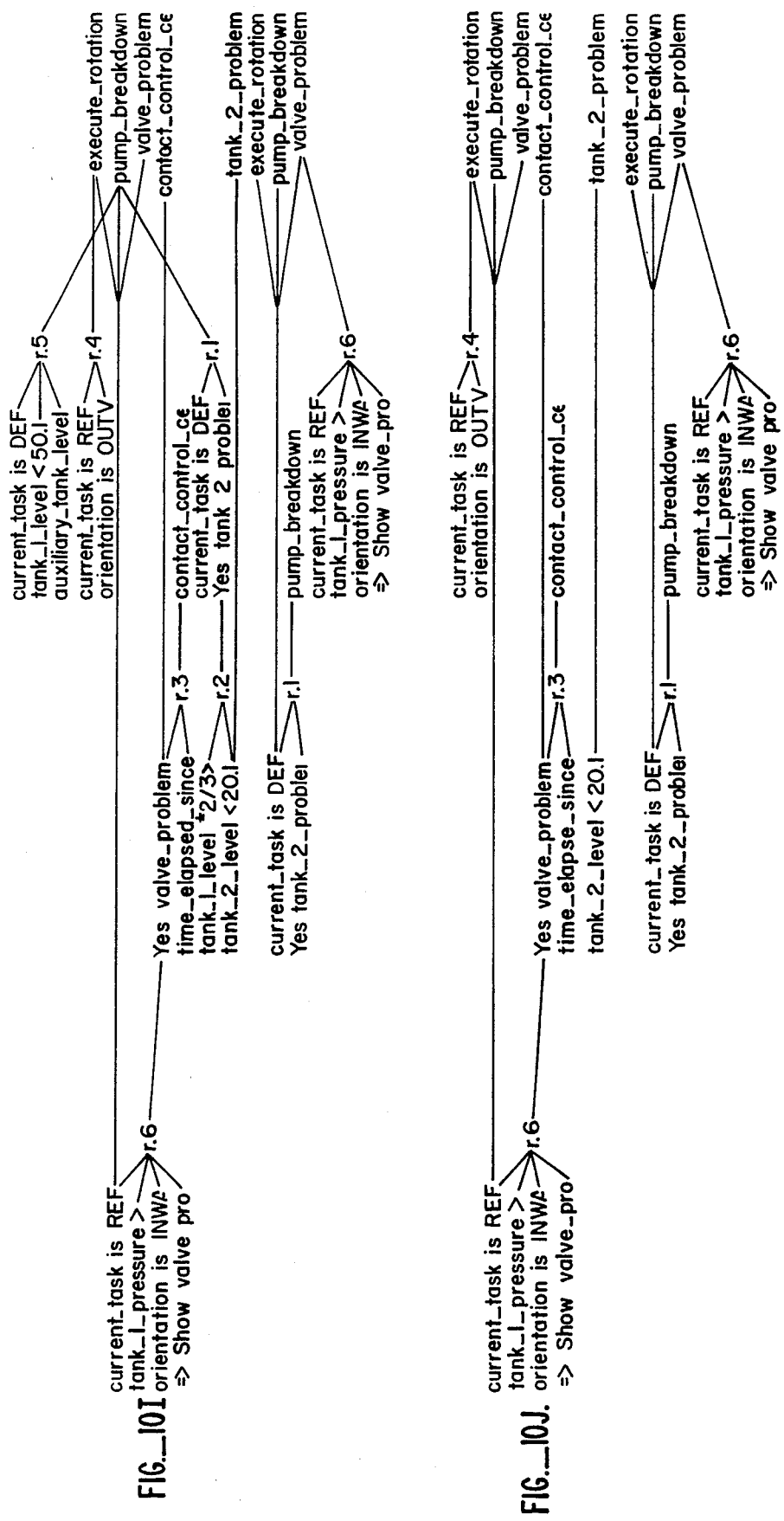

DYNAMIC, INTERACTIVE DISPLAY SYSTEM FOR A KNOWLEDGE BASE

DESCRIPTION

1. Field of the Invention

The present invention relates to the graphic representation of the functional connectivity between elements of knowledge in a knowledge based system, to aid in the design and maintenance of knowledge based applications using such systems and more particularly to a knowledge base browsing mechanism.

2. Background of the Invention

Knowledge based systems provide the possibility to encode knowledge declaratively in a set of elements easily modifiable, which are processed by a kernel program as domain-general as possible. This high-level programming allows on to implement complex programs (diagnosis, planning, design etc . . . ). However, the original preservers of the knowledge (domain experts) need to decompile their knowledge in order to create the knowledge base. This "decompilation" refers to the need to translate one's knowledge into a collection of elements with a given format (sometimes called rules, frames, schema, schemata, contexts, etc . . . ).

There is an unlimited amount of both problems and representations, and thereby of such "chunks" (elements of knowledge).

The links between those chunks are a fundamental aspect of the knowledge base. Each chunk can be considered as belonging to any of the three sets below:

(1) it is, in part or in whole, an argument of another or several other chunks. In other words, its activation (defined as its processing at any time by the kernel program) will induce the activation of other chunks, making the program progress.

(2) it has itself a number of arguments, i.e. other chunks which activation will trigger its own activation by the kernel program.

(3) it is both the argument (not necessarily unique) of one or several other chunks and it has its one or several own arguments.

Overall, the functioning of knowledge based systems results into a sequence of such activations, directed by the input information and the nature of the chunks. One has to distinguish between the possible links and the actual ones. The possible links constitute the set of all links which could be envisioned in a given knowledge base, while the actual links are a subset of the latter set, corresponding to the links actually used to solve a given problem. The present invention addresses both types.

A crucial factor in the development of a knowledge base or set of chunks of knowledge which will solve a problem of any nature is the ability to reconstruct the map of links between the different chunks in order to have a global vision of the knowledge base. It is indeed much easier to relate to a map of relations than to a list of apparently unrelated chunks. The use of text editors to visualize the lists of rules requires the hand-drawing of those relations.

In some instances, it has been possible to visualize on a screen a list of the chunks related to a specific one. Such lists can be obtained but are not further related, thus not providing a global view of the knowledge base and requiring further hand-work. In any case, this hand-work has been at the basis of the financial and human bottleneck for the development of applications with such systems.

THE INVENTION

The present invention concerns a graphic methodology to automatically display (and thus discover for the user) the different links between the elements of knowledge or chunks, independently of the nature of the problem to be solved, the representation of the knowledge, and format of the chunks, and of the hardware involved.

The invention replaces by an automatic process the handwork of linking chunks together. Any given chunk can be displayed on a screen and different methods to send the command allow one to display any or all of the links between one chunk and others, recursively if necessary. The links can be of various orders of precision, and are of different types.

The orders of precision refer to the notion that one could link one chunk to another on the resulting graph by simply specifying this general relation. In other cases, the graphic representation of the link can link each chunk by the very precise elements of them which create this relation (for instance, an element of a chunk could be an action changing the value of another element which is used in another chunk which in turn will be activated if the previous one is).

The goal of the present invention is to provide a set of graphic tools in order to display, check and maintain the functional relationships between elements of knowledge in a knowledge based system.

Browsing Mechanism

The central concept is the ability to select, at any time during the use of the system, a part of one of the displayed chunks (or the only one) and to perform a command which will automatically display the link(s) of a certain nature to other chunks. The latter chunks are thus dynamically added to the drawing. The same function can be applied recursively in any direction until no further knowledge chunks are to be displayed. The resulting drawing can be larger than the display screen and graphic window or screen scrolling mechanisms allow one to move from one area of the overall graph to the other. A series of functions allow one to remove a link and its corresponding chunk(s) from the display, to create a new group of chunks (a group is defined as a set of chunks linked together graphically), and to modify the parameters of the display as a function of the nature of the links (see appendix with the example of the context link), the current state of each item (chunks and their elements, links) and the overall state of the system at the time of display.

The main bottleneck of having to draw the links on paper between the chunks of knowledge is considerably reduced since this task is automated. The automatic reconstruction allows a dynamic browsing through the knowledge base, reconstructing the macroscopic structure of the knowledge necessary for the user to relate properly to the system.

The impact is found in the speed of development (construction and debugging) of a given knowledge base and in the maintenance of the latter. Furthermore, since such drawings can be printed the invention constitutes a unique tool to allow the cooperation of multiple experts in making the knowledge base, a critical factor in knowledge base development. Indeed, the resulting visibility of the knowledge considerably reduces the learning curve of the system, for the first and consequent users by making the internal functioning highly visible and thus accessible for improvement and modifications.

The dynamic browsing mechanism ("DBM") acts as a powerful tool for the phase known as the knowledge acquisition phase, an essential issue in nowadays and tomorrow's intelligent systems. It facilitates the elicitation of knowledge. As a result, and most importantly, the DBM makes the knowledge base system tool accessible to non-experts in artificial intelligence.

It is therefore an object of the present invention to provide an interactive network graphic interface for a computer controlled knowledge system.

It is a further object of the invention to provide, in a computer based knowledge system, a visible knowledge structure that is automatically constructed by the system.

It is yet a further object of the invention to provide a computer based knowledge system that allows the user to browse through a knowledge base to view, and make changes if desired, to the knowledge chunks and in the relationships between them.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is a block diagram of the computerized knowledge base system according to the invention;

FIG. 2 is a block diagram of the overall architecture in one implementation of the invention;

FIGS. 3A through 8 are illustrations of the screen displays for use in explaining the operation of the invention;

FIG. 9 is a flow chart illustrating the operation of the CPU of the system of the invention during a user interaction with the browsing mechanism of the invention; and FIGS. 10A throudh 10J are illustrations of a portion of the screen display for use in explaining the operation of the invention.

DETAILED DESCRIPTION OF THE INVENTION

Recently, computer based systems have been designed which implement programs that imitate human reasoning. They recognize logical patterns that are similar to those recognized by humans, and then reason with them to produce expert like performance. To capture expert reasoning, a process known as "knowledge engineering" is employed. This involves having an expert design declarative structures (which hold the expert's knowledge) and inference engines (which imitate the expert's logic). The system employed in the present invention uses "if ... then ... do ... " rules to represent the domain expert's knowledge.

In prior art systems, large main frame computers have been employed; however, the present invention is implemented on a personal computer as illustrated in FIG. 1.

Referring now more particularly to FIG. 1, a central processing unit 10 which can be a personal computer with internal memory 12 and external memory 14 has data and other instructions interactively entered through a keyboard 16 which may include a mouse type device 18. Various graphical displays illustrating the interactive use of the computer by the user are displayed on a monitor 20. A printer 21 can also be connected to the CPU 10 for printing out, in response to instructions supplied through the keyboard 16 or the mouse 18, selected portions of the knowledge base interrelationships, as will be explained further herein.

Referring now more particularly to FIG. 2, the overall architecture of the invention as implemented is illustrated. The CPU 10 has an operating system 22 and an expert applications program comprised of an expert system kernel 24, a rule compiler 28, an inference engine 26, a dynamic browsing display 30, and with settings 32. Information from the user is supplied by means of the user interface peripheral devices 16 and 18.

Referring now more particularly to FIGS. 3A, 3B and 4, the background of the knowledge system, according to the invention, will be described. FIGS. 3A, 3B and 4 illustrate displays which appear on the monitor 20 during the use of the system.

The rule editor function of the system is illustrated in FIG. 3A. This shows the rules by which the knowledge system is based and the user can choose which rules will be used to perform the operation. The interactive function of the system is standard in that a multiple number of windows appear simultaneously on the display screen of the monitor 20 and the operator manipulates an icon 34 appearing on the screen by means of the mouse 18. When the icon is over a particular function which the user has selected, the user can push a button 36 on the mouse 18 to cause the CPU 10 to implement the displayed function. The user can manipulate the mouse 34 on the dog ear 37 and by clicking the button 36 can cause the "pages" which are displayed to be flipped forward and backward. The rules are alphabetically indexed by Hypothesis. The "buttons" on the right in the FIG. 3B allow rapid movement through the list. Selection of a rule-based operation is made by clicking the button 36 while the cursor 34 is over one of the icons at the bottom of the rule editor. From the view of FIG. 3A, these are (from left to right): (1) create a new rule, (2) modify the current rule, (3) create a new rule by copying the current rule, (4) delete the current rule, and (5) save the knowledge base.

Once the user has selected an operation, a new graphics interface (FIG. 4) appears which is the main development interface. The user can enter and modify all of the rules from this interface. All that is need is to fill in the conditions, the hypothesis, and the actions via the pop-up menus shown in FIG. 4 by using the cursor 34 and the mouse button 36. The basic main development interface consists of the IF slots, the THEN slot, the AND DO slots, and the CONTEXT slots. The user can cause an appropriate menu to pop up by clicking the cursor button 36 while the cursor 34 is over a particular slot. The menu at the left side of the screen shows all of the tests available to form the following rule conditions:

Condition Test

| | |
|---|---|
| CANCEL | do nothing |
| CLEAR | clear test slot |
| YES and NO | test boolean |
| $>, <, \geq, \leq, =, \neq$ | compare numeric equation to constant |
| NAME | declare global synonym |
| IS and IS $\neq$ | compare multi-valued datum to constant |

-continued

| | |
|---|---|
| RESET | set datum to "unknown" |
| EQUAL and UNEQUAL | compare two multi-valued data |

The menu at the right hand side of the screen shows all of the actions that can be performed:

Action Operations

| | |
|---|---|
| CANCEL | do nothing |
| CLEAR | clear operation slot |
| DO | perform numeric equation and assign to datum |
| LET | assign multi-valued datum a constant |
| RESET | set datum to "unknown" |
| SHOW | either type out a text file to the Apropos Window or pop-up a paint picture to fill the screen |
| LOADKB | append another knowledge base to current one |
| EXECUTE | perform external function |
| RETRIEVE | load data from external SYLK file |

The menu illustrated in the middle of the display shown in FIG. 5, which overlaps the previously mentioned menus, is for entering arguments and equations. The COPY DATA and COPY HYPOTHESIS are available from this menu.

Once the rule has been entered, the OK button will darken if the rule is structured properly. If it does not, clicking on the CHECK button will cause the appending slot to be highlighted. If a piece of data information has been misused but the rule is properly structured, an explanatory message will appear after the OK button click.

The above description is for the purpose of showing the context of the present invention. There are three ways a problem can be presented to the system of the present invention:

(1) The data oriented manner, when only some data are known about the problem. The retrieval of this initial data can be automated with the use of an input form. Inference will start with forward chaining.

(2) The hypothesis-oriented manner, in which the user desires confirmation or argumentation of one or more hypotheses. Inference will start with backward chaining.

(3) A mix of both data-oriented and hypothesis-oriented manners, where the user knows about some data and also wishes to test a hypothesis.

The network of interrelationships between the various pieces of known information and the rules which connect them are termed the network and this interrelationship is graphically displayed on the display of the monitor 20 by a statement of the data or rules and by lines drawn connecting them as illustrated in FIG. 6. This screen is caused to appear by manipulating the cursor over the "Inspector" label on the screen and by clicking the button 36. As will be explained in greater detail hereinafter, and which constitutes the primary feature of the invention, the network facility allows the user to browse through a knowledge base in a graphical, highly visual manner, and thus clearly see the relations between the elements of the knowledge base. The browsing tool permits both deductive navigation and evocative navigation of the knowledge base. An intelligent rule-based system must reason from facts (forward chaining) as well from goals (backward chaining). The present invention handles both types of reasoning.

The rule based inferencing process using the present invention is initiated by suggesting a hypothesis, volunteering a datum, or a combination of the two. If any data is volunteered, then the system will drive forward, attempting to establish as many hypotheses as possible. This "forward chaining" can be controlled by the user using the "Strategy" function (FIG. 4). If the user only suggests a hypothesis, the system begins by looking backward ("backward chaining") in an attempt to find sufficient information that will prove the hypothesis. This information can lead the system to other hypotheses to be established which can lead to still others and others, etc.

In order to get a global view of these interrelationships, the user positions the cursor 34 over the "Inspector" portion of the display screen and clicks the button 38 and then selects the overview function. The display shown in FIG. 8 will result. To get a more detailed view, the user positions the cursor 34 over the "Inspector" label, clicks the button 36, and the display of FIG. 6 results. Using the operation icons shown on the left of the screen in FIGS. 6 and 10A-J, the user can navigate through the knowledge islands of the data base. The functions called up by these icons allow investigation of only those areas of the knowledge graphic that are currently of interest.

Referring now to FIG. 6, the icon 38 allows a single or multiple knowledge island display to be presented. The icon 40 displays data that point to the current hypothesis. The icon 42 displays the hypotheses that this datum points to. The icon 44 erases the current link. The icon 46 focuses the attention of the system of this datum or hypothesis and the icon 48 is apropos this datum or hypothesis. Choosing these icons only affects the display, not the actual knowledge graph of the rule base. From this window all of the rules can be viewed by the user and all of the links between the rules can be checked. This allows the dynamic of the process to be monitored, thereby making it a debugging aid for the rule base.

Referring now more particularly to FIG. 9, a flow chart of the steps taken by the CPU in carrying out the navigation or knowledge browsing process is illustrated. First, the CPU 10 watches for a click of the button 36 at step 50. It looks to see where the cursor 34 has been positioned in the graphic zone and determines at step 52 whether the cursor button 36 has again been clicked while the cursor 34 was positioned over an icon. If the answer is yes, the CPU 10 watches for a second click at step 54. If there has been no click, the CPU 10 proceeds to step 56 to select a new icon for display. Thereafter, the CPU returns to step 50 to watch for a second click of the mouse button 36.

Assuming that at step 54 the mouse button 36 had been clicked again, the CPU proceeds to step 58 where it returns the number of the icon 38–48 over which the cursor 34 has been positioned. After a double click of the button 36, the CPU will process the functions spelled out by the icon and update the network at step 62, after which the CPU again returns to step 50.

Assuming that at step 52, there had been no click in regard to the icons, the CPU will find the network descriptor at step 64 and then determine at step 66 whether the operation called for by that descriptor is valid. If not, the CPU 10 returns to step 50. If the answer at step 66 is in the affirmative, the CPU 10 determines at step 68 whether the display will change. If the answer is no, the CPU returns to step 50 and if the answer is yes, the CPU computes the new chunks of knowledge or removes the old ones at step 70. At step 72, the CPU 10 finds new, empty zones in the display or releases some zones. At step 74, the CPU 10 fills the zones with the chunks of knowledge. The network is then updated at step 62 and CPU 10 returns to step 50.

FIGS. 10A-10H, inclusive, illustrate the steps by which the knowledge network can be filled up using the browsing in both the backward chaining (FIG. 10B) and the forward chaining (FIG. 10C) modes. (The terms "backward" and "forward" are to be understood as referring to the logical process and not to any particular direction on the display).

FIGS. 10A, 10B and 10C illustrate how the user has done both forward and backward chaining by positioning the cusor over the "Yes valve—problem" on the display screen of the monitor 20 after (in separate sequences) selecting the icons 40 and 42. Similarly, FIGS. 10B and 10C illustrate how the user can forward chain by positioning the cursor 34 over the "current_task is REF" part of the display after first selecting icon 40.

Attached hereto is Appendix I which is the source code for the knowledge browsing feature of the invention written in the Pascal computer programming language. It will be noted that this programmer refers to certain subroutines, which are not included in Appendix 1; however, these subroutines are well known to those skilled in the art and their function and operation are fully revealed by their titles and are listed in appendix in 2.

Although the present invention has been shown and described with respect to preferred embodiments, various changes and modifications which are obvious to a person skilled in the art to which the invention pertains are deemed to lie within the spirit and scope of the invention.

Appendix I

```
(* © Copyright NEURON DATA, July 1985 By AMG                            *)

(*********************************************************************)
(*                        NetEvent                                    *)
(*                                                                    *)
(* All the event handling for the network                             *)
(*********************************************************************)
{$S NETPROCESS}

(*********************************************************************)
(*               High Level Routines for NetEvent                    *)
(*********************************************************************)

(*
 * NetSelChoose.
 *  This routine proccesses a double click in the magnifying glass
 *  icon.
 *)
PROCEDURE NetSelChoose;
VAR
   theDialogPtr: DialogPtr;
   ItemHit     : INTEGER;
BEGIN
   theDialogPtr:= GetNewDialog( NETCHOOSESEL, NIL, POINTER( -1) );
   SetCursor( Arrow );
   REPEAT
      ModalDialog( NIL, ItemHit );
   UNTIL( ItemHit IN [1..3] );
   DisposDialog( theDialogPtr );
   CASE ItemHit OF
   2:
      (* Display a new group of chunks starting with the selected data *)
      NetEvokeInit( AtomHdl(theSelSign), (NetGrpCHosen = NIGRP1) );
   3:
      (* Display a new group of chunks starting with the selected hypothesis *)
      NetAtomInit( AtomHdl(theSelHyp), (NetGrpCHosen = NIGRP1), FALSE );
   END;
END;  { of NetSelChoose }

(*
 * NetDblSelect.
 *  Processes double clicks in the Tools Icons.
 *)
PROCEDURE NetDblSelect;
BEGIN
```

```
      IF( (theSelHyp <> NIL) AND (theSelSign <> NIL) ) THEN
        NetSelChoose
      ELSE
        IF( theSelHyp <> NIL ) THEN
          NetAtomInit( AtomHdl(theSelHyp), (NetGrpCHosen = NIGRP1), FALSE )
        ELSE
          IF( theSelSign <> NIL ) THEN
            NetEvokeInit( AtomHdl(theSelSign), (NetGrpCHosen = NIGRP1) );
    END;   { of NetDblSelect }

(*
 * FindGZone.
 * Find in which GZone the click has occured.
 * returns FALSE if none.
 * In this examples the Zones are equivalent to fixed columns.
 *)
FUNCTION FindGZone(
               horiz    : INTEGER;
          VAR Col      : INTEGER ): BOOLEAN;
BEGIN
   (* special case for GZone 0 *)
   IF( (horiz < NetTabs[0].HighBound) AND
       (horiz >NetTabs[0].LowBound) ) THEN
     BEGIN
       col:= 0;
       FindGZone:= TRUE;
       EXIT( FindGZone );
     END;
   horiz:= HWinToNet( horiz );  (* change point to net coordinates *)
   col:= 2;
   FindGZone:= FALSE;
   WHILE( (NetTabs[col].LowBound <= horiz) AND ( col <= NETGZone ) ) DO
     col:= col + 1;
   col:= col - 1;
   IF( col = NETGZone + 1) THEN
     EXIT( FindGZone );
   IF( NetTabs[col].HighBound >= horiz ) THEN
     FindGZone:= TRUE;  (* the right GZone has been found *)
END;   { of FindGZone }

(*
 * FindAtom: finds in which atoms the click has occured.
 * On Entry, pos is the vertical position in the display.
 *      col is the horizontal GZone number.
 * On Exit, FimdAtom is a descriptor of the network element on which
 *    the user has clicked.
 *)
FUNCTION FindAtom(
             pos    : INTEGER;
             col    : INTEGER ): NetStHdl;
VAR
  RelPos  : INTEGER;
  theHdl  : NetStHdl;
  theGrp  : NetGrpPtr;
BEGIN
  FindAtom:= NetStHdl( NIL );
  theGrp:= FirstNetGrp;
  WHILE( NextNetGrp( theGrp ) <> NIL ) DO
    BEGIN
      theHdl:= FirstNetHdl( theGrp );
      WHILE( theHdl <> NIL ) DO
        BEGIN
          IF( PosInHdl( pos, theHdl, theGrp ) = TRUE ) THEN
            BEGIN
              FindAtom:= theHdl;
              EXIT;
            END;
          theHdl = NextNetHdl( theHdl );
        END;
```

```
            theGrp:= NextNetGrp( theGrp );
         END;
   END;   { of FindAtom }

(*
 * GetIconNumber.
 *  If the mouse was clicked on one of the tool icons, return its number.
 *  In this example, the icons are in column 0 at the left of the screen.
 *)
FUNCTION GetIconNumber(
            vert  : INTEGER ): INTEGER;
BEGIN
   GetIconNumber:= ( vert - NETGRPHEIGHT ) DIV 33 + 1;
   IF( vert < 32 ) THEN
      GetIconNumber:= 0;
END;   { of GetIconNumber }

(*
 * EventInIcon.
 *  Does the event occur in a tool icon ?.
 *)
PROCEDURE EventInIcon(
            vert  : INTEGER );
VAR
   IconNb  : INTEGER;
   oldTime : LONGINT;
BEGIN
   IconNb:= GetIconNumber( vert );
   IF( (IconNb = NIRULESELECT) OR
      (IconNb = NICLOSE) OR (IconNb = NIRIGHTEXT) ) THEN (*handle double clicks in select ru:
      BEGIN
         oldTime:= NetSeRuTime;
         NetSeRuTime:= TickCount;
         IF( (TickCount - oldTime < GetDblTime) AND
            (NetIconChosen = IconNb) ) THEN (* this should be changed *)
            BEGIN
               CASE NetIconChosen OF
                  NIRIGHTEXT:
                     (* Get to the overview with the double click in arrow short cut *)
                     NetDragWin;
                  NICLOSE:
                     BEGIN
                        (* double click in eraser tool => start with a new drawing *)
                        NetHideAll;
                        InvalGraf;
                     END;
                  NIRULESELECT:NetDblSelect;
               END;
            END;
      END;
   IF( IconNb = NIGRP ) THEN
      BEGIN
         NetGrpChosen:= 3 - NetGrpChosen;
         NetGDrawIcon( NetGrpChosen );
      END
   ELSE
      IF( (IconNb <= NETMAXICON) AND (IconNb <> NetIconChosen) ) THEN
         BEGIN
            InvertIcon( NetIconChosen );
            InvertIcon( IconNb );
            NetLoadCursor( IconNb );
            NetIconChosen:= IconNb;
         END;
END;   { of EventInIcon }

(*
 * OpenRightAll;
 *  Add the right chunks to the display.
 *)
PROCEDURE OpenRightAll(
            theHdl   : NetStHdl;
            FreeDel  : BOOLEAN );
```

```
VAR
  oldNumRight : INTEGER;
  theListHdl  : LstHdl;
  theContHdl  : LstHdl;
  myListHdl   : LstHdl;
  AddNumRight : INTEGER;
  i           : INTEGER;
  how         : WAY;
  theStr      : Str255;
  dummy       : BOOLEAN;
BEGIN
  (* different types of action depending on what is clicked on *)
  CASE TypeofNetHdl( theHdl ) OF
    SIGN:
      AtomMissing( theHdl, RIGHT, theListHdl );
    CONDITION:
      BEGIN
        IF( OpofCondNetHdl( theHdl ) IN
           [SHOW,RETRIEVE,STRATEGY,LKB,EXECUTE] ) THEN
      (* some chunks cannot be expanded *)
          EXIT( OpenRightAll );
        AtomMissing( theHdl, RIGHT, theListHdl );
      END;
  END;
  AddNumRight:= ListLength( theListHdl ) + 1;
  IF( AddNumRight = 0 ) THEN
    BEGIN
      DisposHandle( Handle( theListHdl ) );
      EXIT( OpenRightAll );
    END;
  IF( FreeDel = FALSE ) THEN
    NetFreeDelete;
  (* needs update for checking error condition *)
  oldNumRight:= RightNetHdl( theHdl );
  dummy:= NetStChange( theHdl, 0, AddNumRight );
  FOR i:= 1 TO AddNumRight DO
    BEGIN
      GetContext( theListHdl, i-1, theContHdl );
      LstCopy( theListHdl, i-1, myListHdl );
      (* call the expansion routines *)
      MakeBranch( theHdl, theListHdl, i-1, myListHdl, theContHdl,
        0, oldNumRight + i );
    END;
  (* update the display *)
  NetGrafUpdate;
END;  { of OpenRightAll }

(*
 * ProcRightExt.
 *)
PROCEDURE ProcRightExt(
            theHdl : NetStHdl );
BEGIN
  IF( TypeofNetHdl( theHdl ) = RULE ) THEN
    Exit( ProcRightExt );
  OpenRightAll( theHdl, FALSE );
END;

(*
 * ProcLeftExt.
 *   Add chunks to the left.
 *)
PROCEDURE ProcLeftExt(
            theHdl : NetStHdl );
VAR
  i           : INTEGER;
  theListHdl  : LstHdl;
  theContHdl  : LstHdl;
  oldLeftNum  : INTEGER;
  dummy       : BOOLEAN;
BEGIN
  IF( TypeofNetHdl( theHdl ) = RULE ) THEN
    EXIT( ProcLeftExt );
  IF( TypeofNetHdl( theHdl ) = CONDITION ) THEN
    BEGIN
```

```
      IF( OpofCondNetHdl( theHdl ) IN
        [SHOW,RETRIEVE,STRATEGY,LKB,EXECUTE] ) THEN
        EXIT( ProcLeftExt );
    END;
  FOR i:= 1 TO LeftNetHdl( theHdl ) DO
    BEGIN
      IF( LeftExtDone( theHdl ) = TRUE ) THEN
        EXIT( ProcLeftExt );
    END;
  GetEvoke( theHdl, theListHdl );
  IF( ListLength( theListHdl ) = -1 ) THEN
    BEGIN
      DisposHandle( Handle(theListHdl) );
      EXIT( ProcLeftExt );
    END;
  NetFreeDelete;
  oldLeftNum:= LeftNetHdl( theHdl );
  dummy:= NetStChange( theHdl, 1, 0 );
  theContHdl:= EmptyLst;
  (* expand the drawing *)
  MakeBranch( theHdl, NIL, -1,theListHdl, theContHdl, oldLeftNum + 1, 0 );
  (* update the display *)
  NetGrafUpdate;
END;   { of ProcLeftExt }
(*
 * LinkExists.
 *   take care of minor problems occuring after settings.
 *)
FUNCTION LinkExists(
           leftHdl   : NetStHdl;
           rightHdl  : NetStHdl ): BOOLEAN;
BEGIN
  LinkExists:= TRUE;
  IF( (theTypeNetHdl( leftHdl ) = NRULETYPE) AND
      (theTypeNetHdl( rigthHdl ) = NCONTEXTTYPE) AND (NetContDisp = FALSE) THEN
    LinkExists:= FALSE;
END;   { of LinkExists }

(*
 * NIsLeftVis.
 *)
FUNCTION NIsLeftVis(
           theHdl   : NetStHdl ): BOOLEAN;
VAR
  extHdl  : NetStHdl;
  i       : INTEGER;
BEGIN
  NIsLeftVis:= TRUE;
  FOR i:= 1 TO LeftNetHdl( theHdl ) DO
    BEGIN
      extHdl:= GetLeftExt( theHdl,i );
      IF( theViewedNetHdl( extHdl ) = TRUE ) THEN
        EXIT( NIsLeftVis );
    END;
  NIsLeftVis:= FALSE;
END;   { of NIsLeftVis }

(*
 * NetWillClose.
 *)
FUNCTION NetWillClose(
           theHdl   : NetStHdl ): BOOLEAN;
VAR
  extHdl  : NetStHdl;
  i       : INTEGER;
BEGIN
  NetWillClose:= TRUE;
  FOR i:= 1 TO RightNetHdl( theHdl ) DO
    BEGIN
      extHdl:= GetRightExt( theHdl, i );
      IF( (isNetHdlEmpty( extHdl ) = FALSE) AND
          (theViewedNetHdl( extHdl ) = TRUE) AND
          (LinkExists( theHdl, extHdl) = TRUE) ) THEN
        EXIT( NetWillClose );
```

```
      END;
    IF( NIsLeftVis( theHdl ) = FALSE ) THEN
      EXIT( NetWillClose );
    NetWillClose:= FALSE;
  END;  { of NetWillClose }
    (*
     * NetKeepView.
     *)
    FUNCTION NetKeepView(
                  theHdl   : NetStHdl ): BOOLEAN;
    VAR
      i : INTEGER;
    BEGIN
      NetKeepView:= TRUE;
      FOR i:= 1 TO LeftNetHdl( theHdl ) DO
        IF( IsNetHdlEmpty( GetLeftExt( theHdl, i ) ) = TRUE ) THEN
          EXIT( NetKeepView );
      NetKeepView:= FALSE;
    END;  { of NetKeepView }

(*
   * CloseLeaf.
   *)
  PROCEDURE CloseLeaf( theHdl: NetStHdl; start: BOOLEAN );
  VAR
    i: INTEGER;
    secHdl: NetStHdl;
  BEGIN
    IF( IsNetHdlEmpty( theHdl ) = TRUE ) THEN
      EXIT( CloseLeaf );
    FOR i:= 1 TO RightNetHdl( theHdl ) DO
      BEGIN
        secHdl:= GetRightExt( theHdl, i );
        IF( LinkExists( theHdl, secHdl ) = TRUE ) THEN
          CloseLeaf( secHdl, FALSE );
      END;
    IF( (NetkeepView( theHdl ) = FALSE) AND (start = FALSE) ) THEN
      BEGIN
        SettheDeletedNetHdl( theHdl ):= TRUE;
        SettheViewedNetHdl( theHdl ):= FALSE;
        NCloseExec:= TRUE;
      END;
  END;  { of CloseLeaf }

(*
   * ProcClose.
   * Action of the eraser tool on the graphic display.
   *)
  PROCEDUREE ProcClose(
                theHdl  : NetStHdl );
  VAR
    i         : INTEGER;
    left      : INTEGER;
    theGrp    : NetGrpPtr;
    theFlavor : FLAVOR;
    CloseBool : BOOLEAN;
    Viewed    : BOOLEAN;
  BEGIN
    IF( NetWillClose( theHdl ) = TRUE ) THEN
      NetFreeDelete
    ELSE
  EXIT( ProcClose );
theGrp:= GetGroup( theHdl );
left:= LeftNetHdl( theHdl );
theFlavor:= TypeofNetHdl( theHdl );
CloseLeaf( theHdl, TRUE );
IF( TheFlavor = RULE ) THEN
  BEGIN
    SettheDeletedNetHdl( theHdl ):= TRUE;
    SettheViewedNetHdl( theHdl ):= FALSE;
    NCLoseExec:= TRUE;
  END
ELSE
  BEGIN
```

```
        IF( NIsLeftVis( theHdl ) = FALSE ) THEN
          BEGIN
            Viewed:= FALSE;
            FOR i:= 1 TO RightNetHdl( theHdl ) DO
              BEGIN
                IF( (IsNetHdlEmpty( GetRightEXt( theHdl, i ) ) = TRUE) AND
                    (SettheViewedNetHdl( GetRightExt( theHdl, i ) ) = TRUE) ) THEN
                  BEGIN
                    Viewed:= TRUE;
                    LEAVE;
                  END;
              END;
            IF( Viewed = FALSE ) THEN
              BEGIN
                SettheDeletedNetHdl( theHdl ):= TRUE;
                SettheViewedNetHdl( theHdl ):= FALSE;
                NCLoseExec:= TRUE;
              END;
          END;
      END;
    IF( NCloseExec = TRUE ) THEN
      BEGIN
        CheckGroup( theGrp );
        NetGrafUpdate;
      END;
  END;
END;   { of ProcClose }

(*
 *  NProcRuleSelect.
 *  Action of the magnifying glass icon. Call the restart functions.
 *)
PROCEDURE NProcRuleSelect(
            theHdl  : NetStHdl;
            Erase   : BOOLEAN );
BEGIN
  IF( TypeofNetHdl( theHdl ) = CONDITION ) THEN
    Exit( NProcRuleSelect );
  CASE TypeofNetHdl( theHdl ) OF
    RULE:
      NetHdlAtomInit( theHdl, erase, FALSE );
    SIGN:
      NetSignHdlAtomInit( theHdl, erase, FALSE );
  END;
END;   { of NProcRuleSelect }
  (*
   * ProcGetInfo.
   * Action of the INFO tool on the network.
   * Get an information file about the chunk theHdl is displaying.
   *)
  PROCEDURE ProcGetInfo(
              theHdl  : NetStHdl );
  VAR
    i : INTEGER;
    theStr: Str255;
  BEGIN
    NetHdlToString( theHdl, theStr );
    DisplayInfoFile( theStr );
  END;   { of ProcGetInfo }

(*
   * NetConfirmProcess.
   * Handles the networks clicks in a dialog fashion.
   * theHdl region is inverted while the mouse is inside.
   *)
FUNCTION NetConfirmProcess( theHdl: NetStHdl ): BOOLEAN;
VAR
  theRect : Rect;
  GrafRect: Rect;
  thePoint: Point;
  theGrp  : NetGrpPtr;
  dummy   : BOOLEAN;
```

```
    BEGIN
      theGrp:= GetGroup( theHdl );
      SetTrackMouse( theHdl, theRect );
      GetGrafRect( GrafRect );
      dummy:= SectRect( theRect, GrafRect, theRect );
      NetConfirmProcess:= TrackMouse( theRect );
      SetOrigine( 0, 0 );
    END;  { of NetConfirmProcess }

(*
   * ProcessClick.
   *  this is the actual dispatch routine.
   *)
  PROCEDURE ProcessClick( theHdl: NetStHdl );
  BEGIN
    IF( IsNetHdlEmpty( theHdl ) = NIL ) THEN
      EXIT( ProcessClick );
    IF( NetConfirmProcess( theHdl ) = FALSE ) THEN
      EXIT( ProcessClick );
    Setcursor (watchhdl^^);
    NetGrpCurrent:= GetGroup( theHdl );
    CASE NetIconChosen OF
      NIRIGHTEXT:
        ProcRightExt( theHdl );
      NILEFTEXT:
        ProcLeftExt( theHdl ) ;
      NICLOSE:
          ProcClose( theHdl );   (* now don't erases a group *)
   NIRULESELECT:
      NProcRuleSelect( theHdl, ( NetGrpChosen = NIGRP1 ) );
   NIGETINFO:
      ProcGetInfo( theHdl );
    END; { of case }
  SetCursor (arrow);
END;

(*
 * NetProcessEvent.
 *)
PROCEDURE NetProcessEvent(
          thePoint  : Point );
VAR
  GZone   : INTEGER;
  theHdl  : NetStHdl;
BEGIN
  SetPort( GrafPtr( @NetWindowRec ) );
  (* the two following lines reset global variables *)
  NetGrpCurrent:= NIL;
  (* NoOrgMove;*)
  IF( NProcControl( thePoint ) ) THEN
    EXIT( NetProcessEvent );
  IF FindGZone( thePoint.h, GZone ) THEN
    BEGIN
      IF( GZone = 0 ) THEN
        (* the event occured in the Tools region *)
        EventInIcon( thePoint.v )
      ELSE
        BEGIN
        (* the event was in the display *)
          theHdl:= FindAtom( VWinToNet( thePoint.v ), GZone );
          IF( theHdl <> NIL ) THEN
            ProcessClick( theHdl );
        END;
    END;
  NetGrpCurrent:= NIL;
END;   { of NetProcessEvent }
```

Appendix 2

Description of non documented routines.
These routines not included with the code do not relate directly to the dynamic browsing mecanism but to the internal representation of the display in memory.

- NetEvokeInit
  First Argument: Starting working memory handle
  Second Argument: Should the display be erased. (Boolean)
This subroutine adds a new group to the display, starting on a given memory handle and displaying all the left linked chunks.

- NetAtomInit
  First Argument: Starting working memory handle
  Second Argument: Should the display be erased. (boolean)
  Third Arguement: should the display be totally deleted from memory.
This subroutine adds a new group to the display, starting on a given memory handle and displaying all the rigth linked chunks.

- HWinToNet.
  Translate an absolute position in the network window into an absolute position in the full display in memory.

- FirstNetGrp.
  Returns a pointer to the first group allocated in the display.

- NextNetGrp
  Returns a pointer to the next group allocated in the display.

- FirstNetHdl.
  Returns a handle to the first chunk allocated in a given group

- PosInHdl.
  Given a position, a chunk handle and the group it belongs to, this routines returns if the position is pointing to the chunk.

- NextNetHdl.
  Given a handle to a chunk, return the next chunk allocated ( which will be in the same group ).

- NetDragWin
  Displays the overview of the network.

- NetHideAll
  Erases all the chunks from the display. It doesn't delete them from memory ( This is done by NetFreeDeleted )

- InvalGraf.
  Forces the update of the display.

- AtomMissing.
  Returns in the third argument a list of all the chunks missing. The second argument indicated if we are requesting the missing chunks to the right or to the left.

- OpOfCondNetHdl
  returns the operator of the chunk displayed. This chunk has to be pointing to a condition ( special instance of a chunk )

- ListLength
  Returns the length of a list of chunks.

- NetFreeDeleted
  Deletes from memory the invisible chunks.

- RigthNetHdl.
  Returns the number of chunks already displayed to the right of the current chunk.

- GetContext
  Returns a special type of chunks which can be linked to the current chunk.

- LstCopy
  duplicates a list of chunks.

- MakeBranch
  Calls the allocation routine of the display. The arguments indicate the new lists of chunks and how they should be linked to the current chunk.

- NetGrafUpdate.
  Forces an immediate update of the display.

- TypeofNetHdl.
  Returns the type of the chunk displayed.

- LeftExtDone
  Returns if the left chunks are already displayed.

- LeftNetHdl.
  Returns the number of chunks already linked to the left.

- EmptyLst
  returns an empty list of chunks.

- theTypeNetHdl
  Returns the type of the display handle ( this is different of the chunk type because the same chunk can be displayed several times in different situations )

- GetLeftExt
  Returns a handle to a left linked chunk.

- GetRigthExt
  Returns a handle to a rigth linked chunk.

- IsNetHdlEmpty.
  Returns if the display handle is pointing to a real chunk. ( display handles can be used for graphics operations only )

- theViewedNetHdl
  Returns if the diplay handle is visible in the display.

- NIsLeftVis
  Returns if the display handle is connected to a visible chunk.

- SettheDeletedNetHdl.
  Marks a display handle as deleted

- SettheViewedNetHdl
  Marks a display handle as invisible.

- CheckGroup
  Checks if a group is still visible in the display. If not, this routine deletes it from memory.

- NetHdlAtomInit.
  Calls NetAtomInit with the chunk the display handle is pointing at.

- NetSignHdlAtomInit.
  Calls NetAtomInit with a chunk depending on the chunk the display handle is pointing at.

- DisplayInfoFile
  Brings on the screen some information about hte current chunk.

- SetTrackMouse
  Computes the boundaries the mouse can move inside of, for selecting the current chunk.

What is claimed is:

1. A knowledge system comprising a programmed computer, memory means for storing a knowledge base, said knowledge base including datum, rules which interconnect the datum to create hypotheses, and wherein the interrelationships between the various datum and the rules constitute a network of interrelationships;
   display means for displaying the network of interrelationships as stored in the memory means;
   user information input means for allowing the user of the system to input data, rules and to change the data or rules currently stored in the memory means; and
   means, including the display means, connected to the computer for interactively displaying the network of interrelationships visually and interactively with the changes made by the user.

2. A knowledge system as recited in claim 1 wherein the means for interactively visually displaying the network of interrelationships includes user controlled means for selecting the amount of the network of relationships to be simultaneously displayed on the display means.

3. A knowledge system as recited in claim 1 further comprising printing means connected to the computer and wherein the means for interactively visually displaying the network of interrelationships includes user controlled means for causing the printing means to print out a diagram of the network of interrelationships selected by the user.

4. A knowledge system as recited in claims 1 or 2 wherein the computer comprises an operating system and an expert applications system including an expert system kernel, a rule compiler, an inference engine, and a dynamic browsing display means which allow the user to visually browse through the network of interrelationships by displaying them on the display means.

5. A knowledge system as recited in claim 4 wherein the dynamic browsing means allows the user, at any time during the use of the system, to select a part of one of the displayed interrelationships and to then automatically display on the display means other network interrelationships of a selected nature to the user selected part of the network interrelationship.

6. A knowledge system as recited in claim 1 wherein the network of interrelationships stored in the memory means is larger than can be displayed at any one time by the display means and wherein the computer further comprises means for causing the display means to scroll a graphic window through the network of interrelationships stored in the memory means under the interactive control of the user.

* * * * *